(12) United States Patent
Nessel

(10) Patent No.: US 10,496,132 B2
(45) Date of Patent: *Dec. 3, 2019

(54) OPERATING DEVICE FOR A CONSTRUCTION MACHINE

(71) Applicant: JOSEPH VOEGELE AG, Ludwigshafen/Rhein (DE)

(72) Inventor: Thomas Nessel, Deidesheim (DE)

(73) Assignee: JOSEPH VOEGELE AG, Ludwigshafen/Rhein (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/202,706

(22) Filed: Nov. 28, 2018

(65) Prior Publication Data

US 2019/0094908 A1  Mar. 28, 2019

Related U.S. Application Data

(63) Continuation of application No. 15/068,769, filed on Mar. 14, 2016, now Pat. No. 10,209,739.

(30) Foreign Application Priority Data

Mar. 13, 2015 (EP) .................................... 15158953
Apr. 9, 2015 (EP) .................................... 15162984

(51) Int. Cl.
*G06F 1/16* (2006.01)
*B60K 35/00* (2006.01)
(Continued)

(52) U.S. Cl.
CPC ............ *G06F 1/1632* (2013.01); *B60K 35/00* (2013.01); *B60K 37/06* (2013.01);
(Continued)

(58) Field of Classification Search
CPC ..................................................... G06F 1/1632
(Continued)

(56) References Cited

U.S. PATENT DOCUMENTS 6,394,526 B1   5/2002   Gyllenspetz
6,504,710 B2   1/2003   Sutton et al.
(Continued)

FOREIGN PATENT DOCUMENTS

CN   102530728 A   7/2012
CN   103362057 A   10/2013
(Continued)

OTHER PUBLICATIONS

European Examination Report dated Feb. 8, 2016, Application No. 15162984.7-1604, Applicant Joseph Voegele AG, 7 Pages.
(Continued)

*Primary Examiner* — Anthony Q Edwards
(74) *Attorney, Agent, or Firm* — Brooks Kushman P.C.

(57) ABSTRACT

An operating device for a construction machine includes a plurality of operating elements for adjusting operating parameters of the construction machine, and a display unit which is configured to display technical data. The operating device further comprises a docking station at which the display unit is attached so as to be removed without tools and which is provided for connecting the display unit with at least one data line and/or power supply of the construction machine.

15 Claims, 5 Drawing Sheets

(51) Int. Cl.
*B60K 37/06* (2006.01)
*B60R 11/02* (2006.01)
*E01C 23/00* (2006.01)
*E02F 9/20* (2006.01)
*E02F 9/26* (2006.01)

(52) U.S. Cl.
CPC .......... *B60R 11/0252* (2013.01); *E01C 23/00* (2013.01); *E02F 9/2004* (2013.01); *E02F 9/26* (2013.01); *B60K 2370/81* (2019.05); *B60K 2370/834* (2019.05); *B60Y 2200/41* (2013.01); *E01C 2301/30* (2013.01); *G06F 1/1626* (2013.01)

(58) Field of Classification Search
USPC .................................................... 361/679.41
See application file for complete search history.

(56) References Cited

U.S. PATENT DOCUMENTS

| | | | |
|---|---|---|---|
| 6,644,611 | B1 | 11/2003 | Tai |
| 7,584,007 | B2* | 9/2009 | Eul .................. E01C 19/48 404/84.1 |
| 8,282,312 | B2 | 10/2012 | Braddy et al. |
| 8,634,033 | B2 | 1/2014 | Vanderwall et al. |
| 8,636,442 | B1 | 1/2014 | Sopko, Jr. et al. |
| 8,776,941 | B2 | 7/2014 | Herzberg |
| 8,963,832 | B2 | 2/2015 | Takano |
| 9,035,753 | B2 | 5/2015 | Brueninghaus et al. |
| 9,078,342 | B2 | 7/2015 | Eul et al. |
| 9,079,540 | B2 | 7/2015 | Harding et al. |
| 9,108,689 | B1 | 8/2015 | Shelby et al. |
| 9,434,319 | B2* | 9/2016 | Oldani .................. B60R 11/02 |
| 10,209,739 | B2* | 2/2019 | Nessel .................. B60R 11/0252 |
| 2006/0025914 | A1* | 2/2006 | Buschmann .......... B60R 11/02 701/50 |
| 2006/0045620 | A1* | 3/2006 | Olson .................. E01C 19/006 404/84.1 |
| 2006/0155431 | A1* | 7/2006 | Berg .................. B60K 35/00 701/2 |
| 2007/0044088 | A1 | 2/2007 | Eul |
| 2007/0132894 | A1 | 6/2007 | Vitito |
| 2009/0016818 | A1 | 1/2009 | Hall et al. |
| 2009/0212905 | A1 | 8/2009 | Batz et al. |
| 2010/0037072 | A1 | 2/2010 | Nejah |
| 2010/0054441 | A1 | 3/2010 | Daigle |
| 2010/0097239 | A1 | 4/2010 | Campbell et al. |
| 2010/0250815 | A1 | 9/2010 | Street et al. |
| 2011/0178677 | A1 | 7/2011 | Finley et al. |
| 2011/0259789 | A1 | 10/2011 | Fan |
| 2012/0061983 | A1 | 3/2012 | Seiller et al. |
| 2012/0068832 | A1 | 3/2012 | Feldstein et al. |
| 2012/0075789 | A1 | 3/2012 | DeCamp et al. |
| 2012/0087726 | A1 | 4/2012 | Smieja |
| 2012/0143445 | A1 | 6/2012 | Morath |
| 2012/0162891 | A1 | 6/2012 | Tranchina et al. |
| 2012/0288328 | A1 | 11/2012 | Minich |
| 2013/0051914 | A1 | 2/2013 | Buschmann et al. |
| 2013/0082161 | A1* | 4/2013 | Eul .................. E01C 19/48 250/201.1 |
| 2013/0127737 | A1 | 5/2013 | Shneidman |
| 2013/0242505 | A1 | 9/2013 | Nguyen et al. |
| 2013/0266376 | A1 | 10/2013 | Herzberg |
| 2014/0095000 | A1* | 4/2014 | Waller .................. B60K 37/06 701/2 |
| 2014/0169881 | A1 | 6/2014 | Hagen et al. |
| 2014/0181347 | A1 | 6/2014 | Hamel et al. |
| 2014/0192480 | A1 | 7/2014 | Winkler et al. |
| 2014/0223065 | A1 | 8/2014 | Jolda et al. |
| 2014/0354002 | A1 | 12/2014 | Bisceglia et al. |
| 2015/0212590 | A1 | 7/2015 | Feldstein et al. |
| 2016/0014206 | A1 | 1/2016 | Isobe |
| 2016/0161989 | A1 | 6/2016 | Prejer et al. |
| 2016/0231778 | A1 | 8/2016 | Kaneko |
| 2016/0266610 | A1 | 9/2016 | Nessel |
| 2017/0154006 | A1 | 6/2017 | Tuccinardi et al. |

FOREIGN PATENT DOCUMENTS

| | | |
|---|---|---|
| CN | 205653688 U | 10/2016 |
| DE | 9204559 U1 | 5/1992 |
| DE | 10308897 A1 | 10/2004 |
| DE | 202012003790 U1 | 7/2013 |
| EP | 1755008 A1 | 2/2007 |
| EP | 2377995 A1 | 10/2011 |
| JP | 486553 U | 7/1992 |
| JP | 2002322679 A | 11/2002 |
| JP | 2002325143 A | 11/2002 |
| JP | 2003097338 A | 4/2003 |
| JP | 2004122002 A | 4/2004 |
| JP | 2008508141 A | 3/2008 |
| JP | 2014197823 A | 10/2014 |
| JP | 2015133140 A | 7/2015 |
| WO | 2015014663 A2 | 2/2015 |

OTHER PUBLICATIONS

Japanese Notification of Reasons for Refusal dated Jan. 30, 2017, Application No. 2016-014724, 6 Pages.
Chinese Office Action and Search Report dated Oct. 18, 2017, Application No. 201610140493.8, 9 Pages.

* cited by examiner

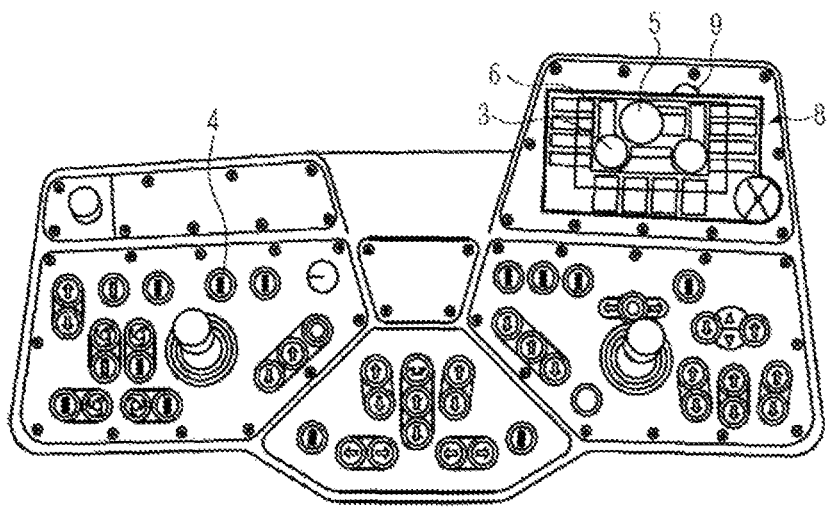
FIG. 3
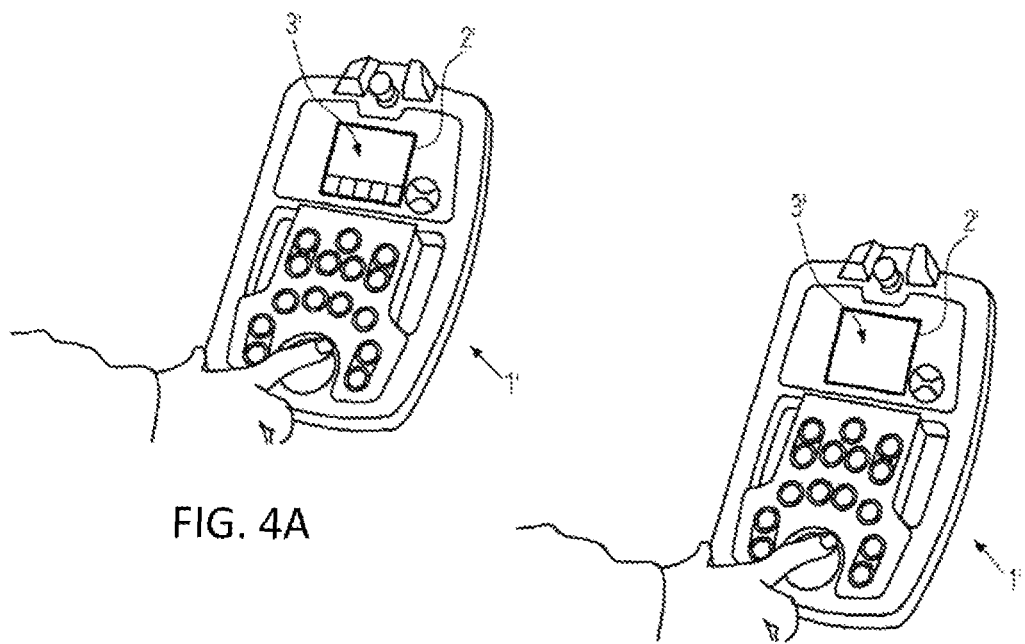
FIG. 4A
FIG. 4B

OPERATING DEVICE FOR A CONSTRUCTION MACHINE

CROSS-REFERENCE TO RELATED APPLICATIONS

This application is a continuation of U.S. application Ser. No. 15/068,769 filed Mar. 14, 2016, which issued as U.S. Pat. No. 10,209,739 on Feb. 19, 2019, and which claims foreign priority benefits under 35 U.S.C. § 119(a)-(d) to European patent application number EP 15 158 953.8, filed Mar. 13, 2015, and European patent application number EP 15 162 984.7, filed Apr. 9, 2015, which are incorporated by reference in their entirety.

TECHNICAL FIELD

The present disclosure relates to an operating device for a construction machine, preferably for a road finishing machine or a feeder.

BACKGROUND

Generic operating devices are employed in conventional construction machines to control working functions, in particular in road finishing machines or feeders. As is well-known, such operating devices comprise a plurality of sensors which are configured to adjust a plurality of operating parameters of the road finishing machine or feeder. For an operator to be able to trace the preset operating parameters, these are displayed by means of a display unit integrally formed in the operating device. By the display unit being integrated in well-known operating devices, the operator may only view the operating parameters displayed by the display unit when he/she is in the direct proximity of the operating device. A further restriction of well-known operating devices is that the display units integrated therein are only used for displaying operating parameters.

SUMMARY

The operating device that will be described below in connection with the present disclosure may be employed for all functionalities of the applicant's WITO system which was presented in April 2013 at the BAUMA in Munich. For example, by means of the operating device according to the disclosure, the following functions of the WITO system may be performed:

entering installation data and automatically correcting the entered installation data;

starting the engine of the road finishing machine or feeder by means of finger scan, eye scan and/or pin code;

automatically adjusting the roof profile on public roads, e.g., at crossings or turning points;

automatically adjusting screeds when cornering;

processing of data of a temperature module attached to the road finishing machine;

monitoring and adjusting a crawler cleaner; and/or receiving data from monitoring units, for example cameras and/or sensors, which monitor the surroundings of the road finishing machine or feeder.

An object underlying the disclosure is to provide an operating device for a construction machine by means of simple technical constructive features in such a way that it is suited for multifunctional employment, in particular to provide an operator with means that facilitate his work and lead to an improved working result.

The disclosure relates to an operating device for a construction machine, wherein the operating device comprises a plurality of operating elements for adjusting operating parameters of the construction machine, and a display unit which is configured to display technical data, in particular at least one of the set operating parameters, operating instructions, service instructions and/or temporary operating states of individual function units of the construction machine. An operator may thus trace, among other things, the operating parameters currently adjusted by him/her on the display unit. This provides the operator at any time with an overview showing whether the selection of the operating parameters has been correctly made corresponding to the operation of the construction machine.

According to the disclosure, the operating device comprises a docking station to which the display unit is attached so as to be removed without using any tools and which is provided for connecting the display unit with at least one data line and/or a power supply of the construction machine. By means of the docking station, it is thus possible to firmly couple the display unit to the operating device or to remove it from the latter, so to speak as a portable electronic unit. Therefore, when the operator is in the direct proximity of the operating device, he/she may firmly connect the display unit with the docking station, i.e., attach it in the docking station. If on the other hand the operator is not in the direct proximity of the operating device, he/she may take along the display unit as a portable mobile unit that may be operated wirelessly by simply taking the display unit out of the docking station. This means that for taking out the display unit from the docking station, he/she does not need any additional tools to release any mechanical coupling. Taking out or undocking the display unit according to the disclosure is not to be understood as dismounting it in the sense of unscrewing or dismantling it. In contrast, the display unit according to the disclosure is intended for functional operation even in the removed or undocked state. To the contrary, the display unit in well-known solutions is only operable when the display unit is mounted in the operating device.

By providing the operator with the display unit as a portable unit, he/she may take it out of the docking station upon termination of the working operation on site and take it home or to an office while the road finishing machine or the feeder remains on site. A theft of the display unit may thus be prevented. Thus, one may moreover avoid undesired weather influences overnight, e.g., frost, on the display unit, leading altogether to an increased service life of the display unit.

The construction machine is preferably a road finishing machine, a feeder for a road finishing machine, a roller vehicle, an excavator, a bulldozer, a milling machine, a rock crushing machine, a tip truck or a tractor, without being restricted to these special types of vehicle.

A particularly sophisticated means is provided for the operator if the display unit is a tablet computer. The latter may be particularly easily attached to the docking station of the operating device due to its flat design. It is moreover excellently suited as portable unit to make it easier for the operator to take along the display unit. Altogether, the display unit designed as a tablet computer provides an easy handling for the operator.

According to a further alternative embodiment, the display unit is provided as a smart phone. While one can assume that the display unit as a smart phone has a smaller screen than in a situation where it is present as a tablet computer, there are in particular advantages concerning the weight and pack volume of the display unit in this embodiment.

Possible operating systems for the display unit are, for example, adapted Linux systems, such as Android from the US-American manufacturer Google, QNX, iOS from Apple, Windows RT/Windows 8, or web-OS of the US-American manufacturer HP. For a high-performance employment of the display unit, in particular processors with ARM architecture are suited. Instead of a hard disk, a flash memory may be used as a mass storage in the display unit, where as an alternative to this, or in supplement, at least one hard disk or an SSD disk may be contained in the scope of the display unit.

For an independent operation of the display unit, the latter preferably comprises at least one separate accumulator which is automatically chargeable when the display unit is attached to the docking station. Here, the accumulator of the display unit is connected to a fixed network, i.e., the power supply of the construction machine, so that it is being charged via the power grid of the construction machine as long as it remains inserted in the docking station. Therefore, no separate charging cable is required. However, it is also possible for the display unit to have an interface available for connecting an external charging cable thereto. With this, the operator may even charge the accumulator of the display unit when he has taken the display unit from the site to his/her home or office.

A particularly ergonomic and stable attachment of the display unit at the docking station is possible if the docking station has a receiving cavity into which the display unit fits. Then, the docking station will simultaneously form an excellent deposition for the portable display unit onto which the display unit may be safely placed even during a paving drive on uneven ground.

According to a further advantageous embodiment of the disclosure, the display unit itself may be received in the receiving cavity in a reversed orientation. A reversed orientation of the display unit means that a screen surface of the display unit is oriented directly facing a surface of the receiving cavity and is no longer visible for the operator from outside. Such an orientation offers particular protection of the screen surface of the display unit, so that it remains operable and protected from scratches for an extended time. Turning the display unit in the receiving cavity of the docking station also prevents the screen surface from being damaged by undesired UV radiation and prevents an operation of the display unit by unauthorized personnel. Moreover, this may help to prevent moisture from precipitating on the screen surface of the display unit.

Preferably, the display unit may be attached to the docking station so as to be lockable without any key or by means of a key. Mechanical decoupling of the display unit from the docking station performed thereby nevertheless permits a functional operation of the display unit in the removed state. Any removal of the display unit from the docking station is thus only permitted to those who have a key provided to this end to release the locking between the display unit and the docking station. Keys intended for locking must not be confused with tools, for example a screw driver, which are used for mounting or dismounting well-known displays.

It is also advantageous for the display unit to be attached movably to the docking station. In this variant, the operator may orient the display unit relative to the docking station such that it may be easily visible from his/her position. Moreover, the operator may orient the display unit depending on insolation, such that he may easily read the operating parameters shown on the display unit.

The display unit may be optionally additionally equipped with a camera. When the operator has taken the display unit out of the docking station, he/she may use it correspondingly as a camera unit, for example to take pictures at the paving site, in particular pictures of a newly laid road pavement. Due to this extended function of the display unit, the operator does not have to take along an additional camera to optionally take photos at the place of employment of the construction machine. The display unit thus fulfills a double function at least in this respect.

It is also helpful for the display unit to comprise at least one interface for peripheral devices, for example a mouse, a printer, a USB port, and/or a VGA port. Thereby, the display unit may be easily functionally also connected to other devices, in particular when it is taken out of the docking station.

According to a further advantageous embodiment of the disclosure, by means of the display unit, a plurality of operating parameters of the construction machine may be adjusted when the display unit is attached to the docking station and/or removed from it. The display unit may thus be used by the operator as an operating element to adjust the operating parameters of the construction machine. In particular, operating parameters, such as a tamper speed, a screed heating temperature, a conveyor speed of the material conveyor system, a paving mode as well as other operating parameters, may be thereby adjusted.

Preferably, the display unit comprises a touch-sensitive display which is available for adjusting a plurality of operating parameters of the construction machine, and/or a virtual keyboard for calling in a display mode. The touch-sensitive display may be easily operated by one finger or a pin. As an alternative or in addition, the display unit may comprise, according to a further embodiment, a voice command function. This enables the operator to give spoken commands to the display unit, for example to adjust a plurality of operating parameters of the construction machine by announcement. It is also conceivable that a plurality of different operating modes may be called in by means of the voice command function which provides the operator with a predetermined number of operating functions.

It is furthermore possible for the display unit to be configured to control digital devices, hydraulic and/or electric function units of the construction machine. The display unit may to this end be provided with corresponding software to perform a selection and control of the respective devices or function units. It is e.g., conceivable that the operator controls, by means of the display unit, a layer thickness measuring device provided at the construction machine, wherein the measuring results may be preferably indicated to the operator with the display unit in real time. It would also be conceivable that, by means of the display unit, a cooling system of the construction machine is controllable.

When the operator has taken out the display unit from the docking station, he/she may perform remote control of the digital devices, hydraulic and/or electric function units of the construction machine by means of Bluetooth, WiFi and/or LTE data radio communication. It is therefore no longer relevant whether the operator is located in the direct proximity of the operating device for adjusting and controlling corresponding devices. He may, according to this variant of the embodiment, rather take along the display unit and optionally perform adjustments and controls of respective devices when he has gone away from the operating device of the road finishing machine or feeder. It will be appreciated that all control functions of the display unit which the latter may perform when it is removed from the docking station may also be performed by the display unit when it is coupled to the docking station. Equally, the display unit may, both in the coupled state and in a state where it is removed from the docking station, also comprise, apart from the respective control functions, functions for receiving data, so that a preferably continuous monitoring of the operating parameters of the construction machine is possible.

It is particularly useful for the operator if the display unit may work online, both in the coupled state or in a state removed from the docking station, i.e., if an Internet connection may be established with it. Thereby, the operator may receive, via the Internet, a plurality of operating and service instructions for a plurality of electronic and/or hydraulic machine systems of the construction machine, in particular for the screed arrangement of the road finishing machine, and/or send, by means of the display unit, technical information to the customer and/or to a service center directly from the site. It is in particular also possible thereby to send data acquired by means of the display unit, for example the pictures taken by the camera provided therein, to an external service center. Optionally, the acquired data may be already evaluated on site by means of an application provided in the display unit to this end. Preferably, the operator may also view training demonstrations by means of the display unit.

The display unit is preferably connected, both in the coupled state and in a state where it is removed from the docking station, to a plurality of receiving units of the construction machine, and it is configured to display data from these. It is conceivable that the display unit is functionally connected to distance measuring systems, docking systems and/or layer thickness measuring systems. It is also conceivable that the display unit acquires and displays data of an engine monitoring system, a tire pressure monitoring system, and/or a thermographic device for monitoring a paving quality and/or a temperature of the newly laid road pavement.

A further advantageous variant is that by means of the display unit, a current functional state of wearing parts of the construction machine may be retrievable and displayable. One may in particular display the condition of the heating rods of a screed heating device of the road finishing machine. Preferably, when the construction machine is started, the display unit indicates a critical functional state of wearing parts of the construction machine, so that the operator is informed immediately at the beginning of his/her work whether wearing parts of the construction machine optionally must be replaced. It would in particular also be possible for the display unit to indicate, when the construction machine is started, a filling level of a fuel tank for the drive unit.

It would also be conceivable for the display unit to be configured for data exchange with an external station. The display unit may communicate, for example, with a satellite to determine, based on such data exchange, a position of the construction machine which may be indicated to the operator on the display unit. It is furthermore conceivable for the display unit to communicate with another vehicle on site by data exchange, for example with a roller vehicle, to be informed about specific working parameters, for example a roller measure. In this respect, the operator may then perform a manual or automatic adaptation of certain operating parameters at the construction machine.

According to another variant, an operation of the construction machine may only be started when the display unit is functionally attached to the docking station. The display unit functions here as a key, where an additional ignition key for starting the engine of the construction machine is no longer necessary.

Against this background, it would also be possible to design the display unit as an electronic registration certificate, i.e., with authorization parameters, so that in this respect, a predetermined selection of functions at the construction machine is activated for the operator.

To ensure that the construction machine may only be operated by a certain person, the display unit may comprise person identification software by means of which only a certain circle of persons is enabled to start the construction machine.

The display unit offers a further advantageous benefit when it has a hands-free equipment. By means of this equipment, the operator may, for example, communicate with other workers on site or inform external experts about the work result. The display unit virtually fulfills the function of a smart phone, so that the operator does no longer need his/her own mobile telephone or smart phone at the place of employment.

In particular during night works, it is advantageous for the display unit and/or the docking station to comprise an illumination device. This facilitates the connection of the display unit with the docking station for the operator.

Preferably, the operating device is a control panel on a control platform of a road finishing machine or feeder, or a screed control stand of the road finishing machine.

Corresponding to the above explanations, the operating device of the disclosure is an apparatus of a construction machine, preferably a road finishing machine or a feeder. It is nevertheless conceivable that the operating device according to the disclosure is also employed in other vehicles, for example land vehicles or forestry vehicles, or at other stationary systems.

Embodiments of the disclosure will be described with reference to the attached drawings.

BRIEF DESCRIPTION OF THE DRAWINGS

FIG. 3 shows an operating device according to the disclosure with a display unit in the docking station;

FIGS. 4A and 4B show a screed control stand with an operating device according to the disclosure;

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
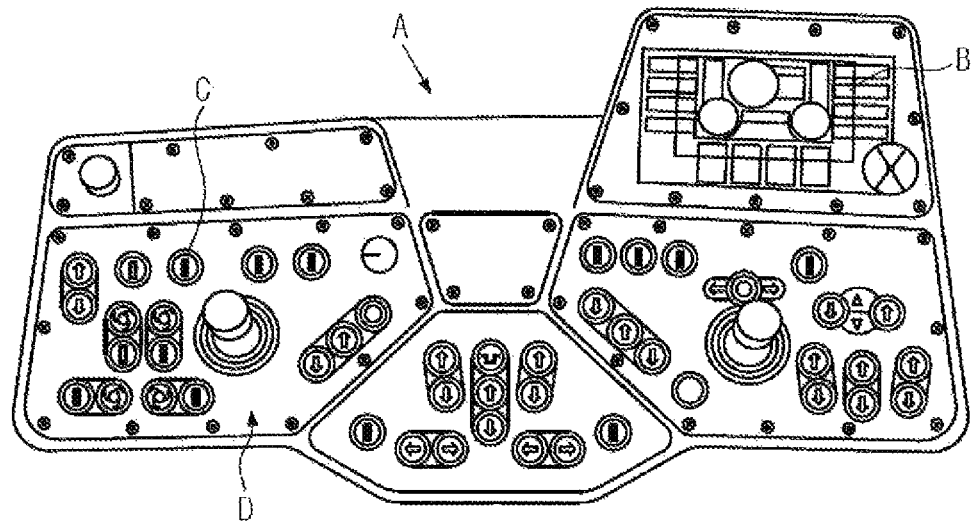
FIG. 1 shows an operating device according to prior art.

FIG. 1 shows a well-known operating device A with a display unit B integrally (i.e., permanently) installed into it. The operating device A comprises a plurality of buttons C which are associated with respective operating modules D of the operating device A. The display unit B is permanently installed in the operating device A and cannot be removed from it, at least not without tools. An operation or inspection of the display unit B is therefore only possible if an operator is positioned directly in front of the operating device A.

Figure 2:
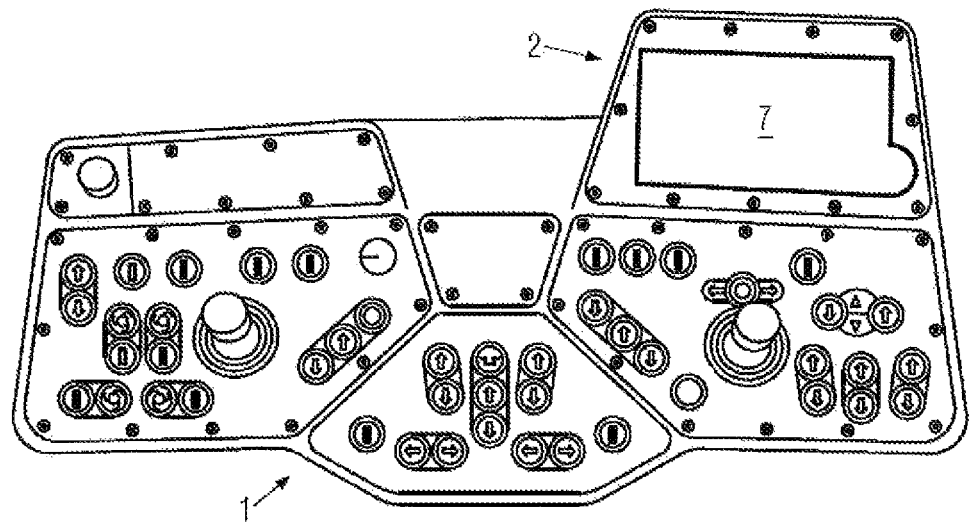
FIG. 2 shows an operating device according to the disclosure without display unit in the docking station.

FIG. 2 shows an operating device 1 according to the disclosure which, in contrast to the operating device A of FIG. 1, comprises a docking station 2. The docking station 2 serves for receiving and functionally coupling a display unit 3 shown in FIG. 3 with the operating device 1. The display unit 3 is a portable electronic device which may be received in the docking station 2. It may in particular be designed as a smart phone or a tablet computer.

FIG. 3 shows a plurality of operating elements 4 that are supported by a base or frame and by means of which operating parameters 5 may be adjusted whose values or settings can be seen on the display unit 3. The operating parameters 5 show the operator the operating state of devices connected to the operating device 1, for example hydraulic and/or electric functional units. Furthermore, the display unit 3 inserted in the docking station 2 comprises a plurality of touch-sensitive sensors 6 which are aligned at the edge of the display unit 3. The display unit 3 is received in a receiving cavity 7 (see FIG. 2) of the docking station 2. The receiving cavity 7 is designed such that the display unit 3 is aligned with a frame region 8 of the frame of the operating device 1 without any perceptible projection. Furthermore, FIG. 3 shows a finger cavity 9 by means of which the insertion or removal of the display unit 3 into or from the docking station 2 is facilitated.

FIG. 4A shows a further operating device 1' according to the disclosure. The latter is designed as a screed control stand. The operating device 1' of FIG. 4A also has a portable display unit 3' which is attached in a docking station 2' of the operating device 1' as an independent, portable module. Referring to FIG. 4B, the display unit 3' may also be received in a receiving cavity of the docking station 2' in a reversed orientation. A reversed orientation of the display unit means that a screen surface of the display unit is oriented directly facing a surface of the receiving cavity and is no longer visible for the operator from outside.

The operating device 1 and the operating device 1' thus both comprise, as an inventive element, a dockable and undockable display unit 3, 3' which is available for the operator as removable module.

Figure 5:
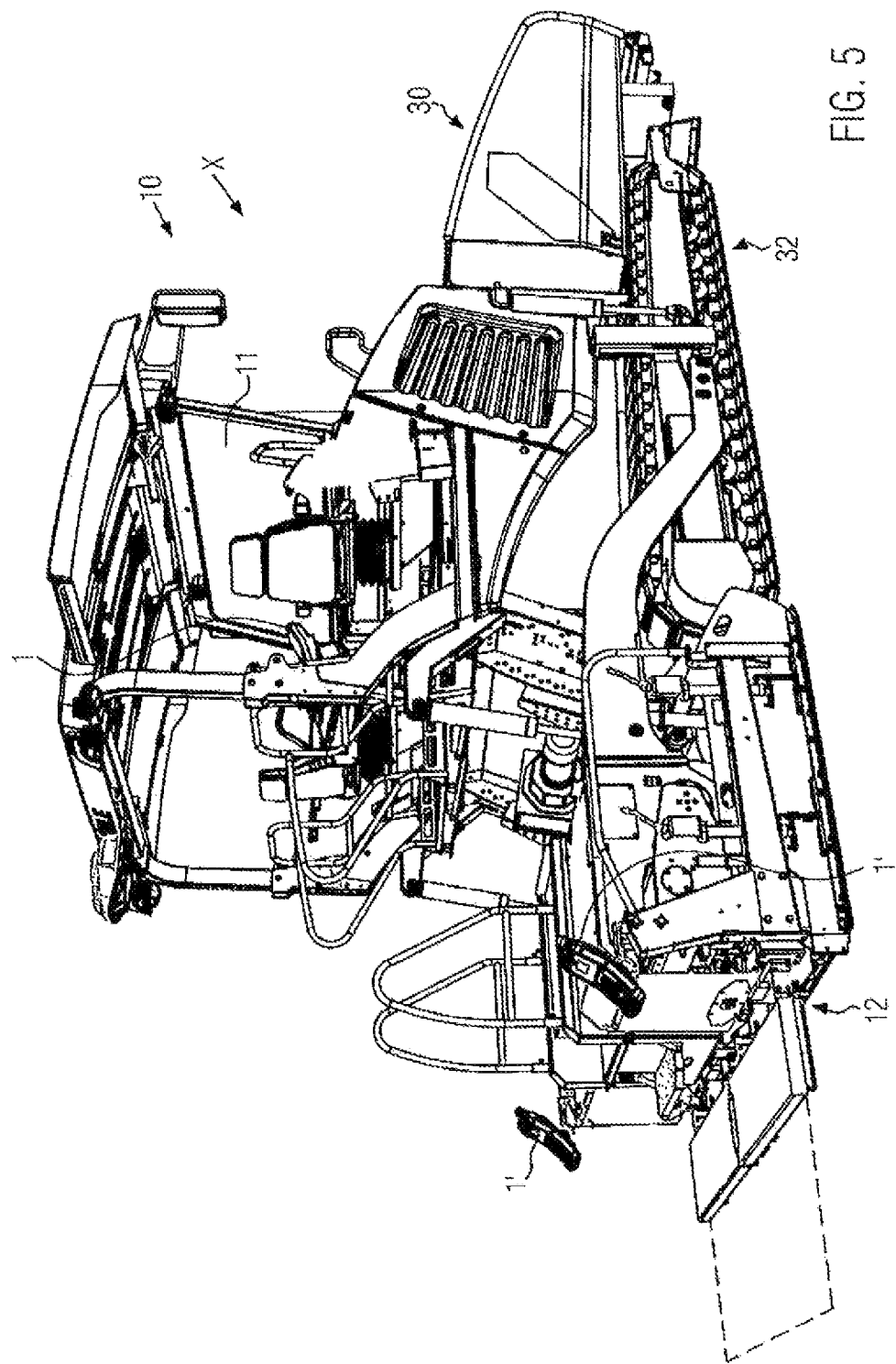
FIG. 5 shows a construction machine designed as a road finishing machine with an operating device according to the disclosure.

FIG. 5 shows a construction machine X which is present, according to this embodiment, as a road finishing machine 10 equipped with a control platform 11 and a screed control stand 12. The control platform 11 includes the operating device 1 according to the disclosure. Two operating devices 1' are provided at the screed control stand 12. The road finishing machine 10 comprises a material bunker 30 in which paving material may be received. The paving material received in the material bunker 30 is transported from there via a non-depicted conveyor device underneath the control platform 11 to a screed 31 of the road finishing machine. The screed 31 produces a new road pavement from the provided paving material. According to FIG. 5, the road finishing machine 10 furthermore comprises a tracklaying gear 32. By means of the operating device 1, 1' according to the disclosure, for example working functions at the screed 31 may be adjusted. Furthermore, the operating device 1, 1' according to the disclosure is preferably configured to adjust a driving speed at the tracklaying gear 32 for the road finishing machine 10.

Figure 6:
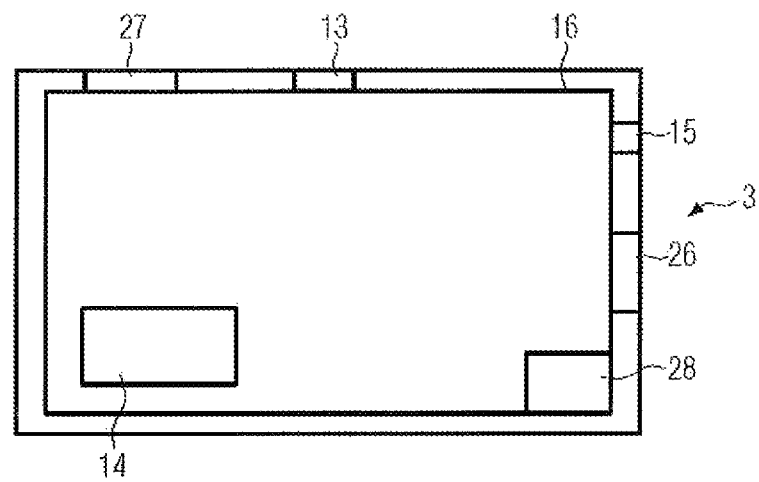
FIG. 6 shows a schematic representation of the removed display unit with an accumulator, camera and periphery interface.

FIG. 6 shows the display unit 3 employed in the disclosure in a schematic representation. The display unit 3 comprises a camera 13 which is provided for taking digital pictures. The operator may therefore also use the display unit 3 as a camera to optionally record the paving result. Furthermore, FIG. 6 shows that the display unit 3 comprises an accumulator 14. The accumulator 14 ensures that the display unit 3 obtains sufficient power supply even if it is removed from the docking station 2 of the operating device 1, 1. All functions of the display unit 3 may therefore be performed even when the display unit 3 is decoupled from the docking station 2.

FIG. 6 also shows an interface 15 for peripheral devices. This may be a USB or a VGA interface. The interface 15 permits to establish a connection between the display unit 3 and other devices, in particular when the display unit 3 is removed from the docking station 2. Finally, FIG. 6 shows that the display unit 3 comprises an e.g., touch-sensitive display 16, a hands-free equipment 26 and an illumination device 27. As is shown in FIG. 3, the touch-sensitive display 16 may include a plurality of touch-sensitive keys 6. Finally, FIG. 6 shows person identification software 28 which may detect, for example by means of a photo or fingerprint technology, whether the operator is authorized for the operating device 1, 1'.

Figure 7:
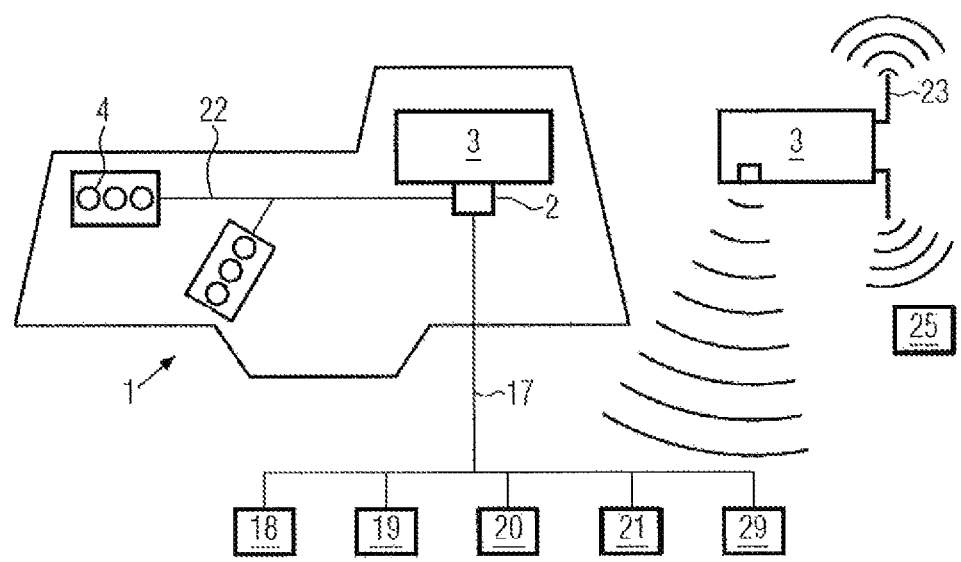
FIG. 7 shows a schematic representation of the operating device according to the disclosure in connection with other units of the road finishing machine or feeder.

FIG. 7 shows the operating device 1 according to the disclosure with a docked display unit 3. The display unit 3 is coupled to the docking station 2. The display unit 3 is operatively linked to a plurality of devices of the road finishing machine 10 by means of the docking station 2 and a schematically shown data line leading away from it and/or a power supply 17. The devices may be, for example, digital devices 18, hydraulic and electric functional units 19, 20, 21 of the road finishing machine 10, and/or wearing parts 29.

Furthermore, FIG. 7 shows that the display unit 3 is linked to the respective operating elements 4 of the operating device 1 via the docking station 2 and a further data line 22 leading away from it. Thereby, inputs by means of the operating elements 4 may be displayed on the display unit 3.

The display unit 3 is configured such that bidirectional communication may take place between it and the devices connected thereto as well as operating elements 4 of the operating device 1.

Finally, FIG. 7 shows, also in a schematic representation, that the display unit 3 taken out of the docking station 2 may also wirelessly communicate with the respective devices 18, 19, 20, 21. This way of communication is also possible with the operating elements 4 of the operating device 1. Furthermore, FIG. 7 shows that the removed display unit 3 may work online via an Internet interface 23 embodied in the display unit 3 and communicate with an external station 25.

Figure 8:
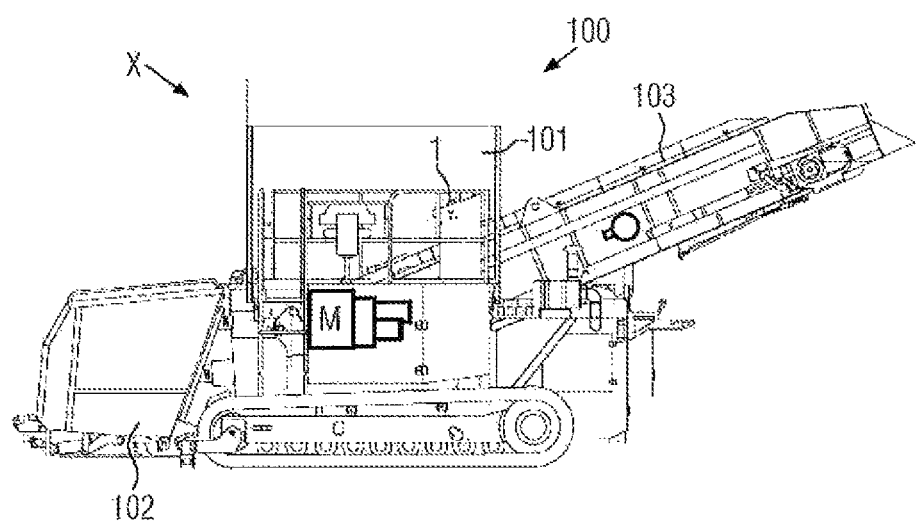
FIG. 8 shows a construction machine designed as a feeder with an operating device according to the disclosure.

FIG. 8 shows that the construction machine X is designed as a feeder 100 which is equipped with the operating device 1 according to the disclosure which is provided on the control platform 101 of the feeder 100. The feeder 100 comprises a material bunker 102 from which paving material may be provided via a transport belt 103 to a road finishing machine according to FIG. 5.

The operating device 1, 1' according to the disclosure provides the operator with a multifunctional display unit 3, 3' by means of which he/she may perform different functions at the construction machine X. Here, the display unit 3, 3' is not only restricted to displaying operating parameters but offers a multifunctional tool to optionally make adjustments of different operating parameters at the construction machine X, in particular at the road finishing machine 10 or feeder 100.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An operating device for a construction machine, the operating device comprising:
    a plurality of operating elements for adjusting operating parameters of the construction machine;
    a display unit configured to display technical data; and
    a docking station at which the display unit is removably attachable so as to be removable without tools and which is provided for connecting the display unit with at least one data line and/or power supply of the construction machine;
    wherein the display unit in a docked state or in an undocked state is configured to control digital devices, hydraulic functional units and/or electric functional units of the construction machine, the display unit is configured to display data from a receiving unit fixed to the construction machine, and the display unit comprises a tablet computer configured to work online, and wherein the operating device is formed as a control panel for a control platform of a road finishing machine or a feeder or a screed control stand of the road finishing machine.

2. The operating device according to claim 1 wherein the display unit comprises an accumulator which is automatically chargeable when the display unit is attached in the docking station.

3. The operating device according to claim 1 wherein the docking station comprises a receiving cavity into which the display unit fits.

4. The operating device according to claim 3 wherein the display unit may be received in the receiving cavity in a reversed orientation.

5. The operating device according to claim 1 wherein the display unit is attached to the docking station in a lockable manner.

6. The operating device according to claim 1 wherein the display unit is movably attachable to the docking station.

7. The operating device according to claim 1 wherein the display unit comprises a camera and/or at least one interface for peripheral devices.

8. The operating device according to claim 1 wherein, by means of the display unit, a plurality of operating parameters can be adjusted when the display unit is attached in the docking station or removed from the docking station.

9. The operating device according to claim 1 wherein the display unit comprises a touch-sensitive display.

10. The operating device according to claim 1 wherein a current functional state of wearing parts of the construction machine is retrievable and displayable by means of the display unit.

11. The operating device according to claim 1 wherein the display unit is configured for data exchange with an external station and/or with other vehicles.

12. The operating device according to claim 1 wherein the display unit is configured to permit an operation of the construction machine when the display unit is attached in the docking station.

13. The operating device according to claim 1 wherein the display unit comprises person identification software and/or handsfree equipment.

14. The operating device according to claim 1 wherein the construction machine is a road finishing machine, a feeder, a roller vehicle, an excavator, a bulldozer, a milling machine, a rock crushing machine, a crane vehicle, a tip truck or a tractor.

15. A road finishing machine, feeder for a road finishing machine, roller vehicle, excavator, bulldozer, milling machine, rock crushing machine, crane vehicle, tip truck or tractor comprising the operating device according to claim 1.

* * * * *